US010733674B2

(12) United States Patent
Unsworth et al.

(10) Patent No.: US 10,733,674 B2
(45) Date of Patent: Aug. 4, 2020

(54) SYSTEM AND METHOD FOR PATTERN-RECOGNITION BASED MONITORING AND CONTROLLED PROCESSING OF DATA OBJECTS BASED ON CONFORMITY MEASUREMENTS

(71) Applicant: Swiss Reinsurance Company Ltd., Zurich (CH)

(72) Inventors: Rory Unsworth, Zurich (CH); Jorge Paya, Unterentfelden (CH)

(73) Assignee: Swiss Reinsurance Company Ltd., Zurich (CH)

( * ) Notice: Subject to any disclaimer, the term of this patent is extended or adjusted under 35 U.S.C. 154(b) by 590 days.

(21) Appl. No.: 15/468,886

(22) Filed: Mar. 24, 2017

(65) Prior Publication Data

US 2018/0165768 A1    Jun. 14, 2018

Related U.S. Application Data

(63) Continuation of application No. PCT/EP2014/071319, filed on Oct. 6, 2014.

(51) Int. Cl.
*G06Q 40/08* (2012.01)
*G06F 16/901* (2019.01)
(Continued)

(52) U.S. Cl.
CPC ......... *G06Q 40/08* (2013.01); *G06F 9/30094* (2013.01); *G06F 16/901* (2019.01);
(Continued)

(58) Field of Classification Search
CPC ..................................................... G06Q 40/01
(Continued)

(56) References Cited

U.S. PATENT DOCUMENTS 9,804,588 B2 * 10/2017 Blevins .............. G05B 19/4184
2001/0014877 A1 * 8/2001 Defrancesco, Jr. .... G06Q 10/10
705/38
(Continued)

OTHER PUBLICATIONS

GENIUSTM Automated Underwriting System: Combining Knowledge Engineering and Machine Learning to Achieve Balanced Risk Assessment David C. Golibersuch (Year: 1995).*
(Continued)

*Primary Examiner* — Bruce I Ebersman
*Assistant Examiner* — John A Anderson
(74) *Attorney, Agent, or Firm* — Oblon, McClelland, Maier & Neustadt, L.L.P.

(57) ABSTRACT

A pattern-recognition based method and system that generate a plurality of block elements based on predefined boundary conditions provided by an automated underwriting system, capture and scan a workflow object within a workflow pathway thereby recognizing and identifying block elements of a recognition block-map in the captured workflow object, determine a proximity factor relative to each workflow object of a second database, measure a corresponding proximity factor by matching recognized block elements of the captured workflow object with block elements of a workflow object of the second database, provide the measure for the proximity of the two workflow objects based on the mutually allocatable block elements, and generate and assign a conformity index to the captured workflow object based on the conformity of the recognized block elements with a stored block elements of a first searchable data structure.

26 Claims, 10 Drawing Sheets

(51) Int. Cl.
  *G06F 16/903* (2019.01)
  *G06Q 10/10* (2012.01)
  *G06F 9/30* (2018.01)
  *G06K 9/00* (2006.01)

(52) U.S. Cl.
  CPC ....... *G06F 16/903* (2019.01); *G06K 9/00335* (2013.01); *G06Q 10/10* (2013.01)

(58) Field of Classification Search
  USPC .......................................................... 705/4
  See application file for complete search history.

(56) References Cited

U.S. PATENT DOCUMENTS

2015/0178631 A1* 6/2015 Thomas ............... G06K 9/0053
  706/12
2019/0095968 A1* 3/2019 Ceribelli ............ G06Q 30/0609

OTHER PUBLICATIONS

PCT International Preliminary Report on Patentability dated Feb. 8, 2017 in WIPO International application No. PCT/EP2014/071319.

* cited by examiner

Comparison method: DOT PLOT MATRIX

SYSTEM AND METHOD FOR PATTERN-RECOGNITION BASED MONITORING AND CONTROLLED PROCESSING OF DATA OBJECTS BASED ON CONFORMITY MEASUREMENTS

CROSS-REFERENCE TO RELATED APPLICATION

This application is a continuation of International Application No. PCT/EP2014/071319, filed on Oct. 6, 2014, the entire contents of which are incorporated herein by reference.

FIELD OF THE INVENTION

The present invention relates to a pattern-recognition-based control and monitoring system for automated underwriting systems or automated pattern-recognition based data-capturing systems providing risk sharing of risk exposed components. In particular, the present invention relates to control systems for monitoring the workflow of the underwriting system or of pooled underwriting objects by capturing workflow objects in the underwriting process flow, and/or underwriting objects from a source of pooled objects, wherein additional process states are triggered, when non-conforming workflow objects are detected within the process flow, by means of the control and monitoring system. More particularly, the invention also relates to a control system for monitoring and dynamically adapting portfolios of pooled risk transfer objects.

BACKGROUND OF THE INVENTION

In consideration of the wide deployment of risk transfer technologies worldwide, in particular as provided by insurance and reinsurance systems, the importance of these systems in maintaining the operation and operational conditions on the industry-wide level becomes apparent. However, a technological approach to many problems in this field is often difficult. For example, it is important to improve and adjust the physical design and technological implementation of such risk transfer systems in order to cope with any emerging problems; problems involving, e.g., the fact that the risk assessment can be based on reproducible results, that the error rate of the measurement of pooled risks can be minimized, that the enormous amount of data can be processed and taken into account in the measurements, and that the operation of such systems can be adjusted to quickly changing environmental condition-related parameters, and/or improved by self-adaptation. Furthermore, it is also important, that the use of the enormous resources of data can be systematized and dynamically used, which requires appropriate technical modalities and physical system designs.

Significant concerns for most automated risk transfer systems are data quality and data quantity. Estimates in the industry have found that about 25% of the operational times of insurance systems are expended on data quality issues. Moreover, related to the technical impact of bad data quality, a further survey found that about 30% of automation problems are due to poor data quality and that automated analyses are adversely affected by data quality issues, thereby often rendering automated risk transfer systems too unreliable for self-sufficient day-to-day live operations, thus reducing them to stand-alone running systems; i.e., systems that operate without human interaction and control, thereby measuring and reacting in a self-adapting manner to on changing environmental conditions. Some basic technological problems are merely related to the accuracy of data and the amount and complexity of data to be processed. Some other technical issues relate to characteristics, such as completeness and timeliness; however, these issues often end again in the problem of data recognition, data acquisition, data quality and, finally data processing. The measurement and determination of risks, in particular during the process of risk pooling of exposed components by means of resource pooling systems and, more particularly, at the level of fixing the individual risk transfer condition parameters, are technical key features in the operation of automated risk-transfer and risk-pooling systems. However, measurements of the risk, as it relates to a specific risk transfer, requires the systems to operate based on probable most up-to-date data, which, in particular, requires not only a modality for measuring and capturing appropriate measuring parameters but also appropriately fast and reliable data recognition and processing. It must be added to the above comments that cheap data storage, along with changes in regulatory requirements, have led to extraordinary amounts of data being captured, stored, and provided to insurance systems. On one hand, the processing of these data quantities requires appropriately adapted systems, as mentioned. One the other hand, these enormous amounts of data also amass an enormous error incidence and inconsistencies, which hinders the operation of automated systems. Therefore, on the other hand, it is important to ensure that, already on the technical level of generating new data, monitoring modalities are in place by means of appropriately implemented and fast-reacting control and monitoring systems.

For automated underwriting systems providing the basis for the automated adaption and determination of condition-related parameters of associated risk transfers, an underwriting process-flow for underwriting workflow objects comprises the technical and/or procedural steps required for executing the underwriting process with regard to an object; i.e., the underwriting process, the technical and other means to conduct the processing steps, and the transfer and flow of data/signaling between the means and/or steps for executing the process on the object. Each step is defined by a set of processes, activities or tasks that need to be implemented. Within an underwriting workflow, objects for underwriting (e.g., risk transfer objects comprising operational condition parameters for the risk transfer, i.e. technical objects affecting the operation and interaction of the resource pooling system and providing risk cover by pooling resources from risk exposed components, and triggering risk events in order to automatically cover the impact of occurring risk events by means of the transfer of the pooled resources) pass through the different steps in the specified order, from start to finish, and the underwriting processes at each step are executed either by dedicated technical processing devices or means, by activating specific system functionalities (also, e.g., computer program products), or by dedicated signaling to specific devices or people intended to perform activities on the object. Automated underwriting workflow systems can be set up using a visual front end, or they can be hard-coded, and their execution is delegated to a workflow execution engine that handles the call-up and signal generation of the remote devices or applications.

In the prior art, underwriting workflow systems for automating risk transfer belong to the field of so-called production workflow systems. The production or industrial process systems are dedicated to steering and executing processing steps of technical objects, such as operational parameters, devices or products, by steering and operating appropriate devices for executing the activities of the workflow objects. Regarding data objects, the process systems also serve for functional processing and the computation of data objects, in particular for the purpose of standardizing the operational interaction of such systems by generating and adjusting workflow objects by means of processing them within the workflow, i.e. the underwriting process flow.

Concerning the monitoring and control systems for such automated underwriting systems, the prior art envisions automated underwriting workflow systems that are able to provide various capabilities for the monitoring of workflow processes, which are modeled and executed within the workflow system. Such capabilities can include, for example, analysis tools for the measurement and display of metrics with respect to the status of the processes, times for executing work steps in the context of the processes, and [management of] bottlenecks within the processes. These capabilities can also be transferred to the underwriting workflow system for underwriting workflow processes, which are executed in systems that are external to the underwriting workflow system. Many underwriting systems of the prior art comprise, as the core, a workflow execution engine, a process management system or a similar control device/system for controlling and monitoring the processing of the workflow objects. The workflow execution engine of the workflow systems can, e.g., be implemented as a processor-based automation means of the underwriting process flow. The workflow execution engine steers a sequence of activities (process tasks), interactions and signaling with execution devices or means, or in interaction with human resources (users) or IT resources (software applications and databases), as well as rules for controlling the progression of processes throughout the various stages that are associated with each activity.

However, at the various stages of the underwriting process, activities typically require human interactions: i.e., user control or data entry through a form. For certain underwriting workflow systems, one of the ways for automating and operating the steering and monitoring tasks of the processes by means of a workflow execution engine is to develop the appropriate processor codes and applications that guide a processor-based workflow execution engine for the execution of the required steps of the underwriting process; however, in practice, such underwriting workflow execution engines are not able to accurately execute all the steps of the underwriting process by means of the underwriting workflow system while assuring, thereby, the operational stability of the underlying resource pooling system for the pooled risks. To solve this problem, in the prior art, the typical approach envisions the use of a combination of software and human intervention; however, this approach is quite complex rendering the reproducibility, the predictability, and even the information flow and documentation process difficult. Further, with this approach, due the amount of processed workflow objects, it is impossible to provide an automated control for the underwriting systems that operate dynamically and optimized based on a monitoring of all processed underwriting workflow objects.

Another problem in the prior art underwriting system is that workflows are difficult to generate and/or to adapt dynamically, due to a lack of the appropriate measuring, monitoring and control systems, which allow for filtering and dynamically recognizing non-conforming workflow objects. Moreover, upon reaching a certain process step in the workflow, it can become necessary to make adjustments to the processing by way of steps which are not predictable at the beginning of the underwriting process flow or workflow, and which can depend on environmental parameters or operational parameters of the risk exposed components and/or the resource pooling systems, i.e. the automated insurance systems. However, such an adaptation of the underwriting conditions and/or the pooled risk portfolio of transferred risk critically depend on correctly measuring and recognizing non-conforming underwriting objects, and, even more so, on a correct measurement of the possible impact of such non-conforming underwriting objects based on their level of non-conformity.

SUMMARY OF THE INVENTION

It is one object of the present invention to provide a system and method for a pattern-recognition-based control and monitoring system for underwriting systems or other pattern-recognition based automated data capturing systems, which provides risk sharing for risk exposed components. The systems can, in particular, be used in monitoring large data transfers, controlling automated risk underwriting, as automated insurance systems with appropriate interfaces, or automated surveillance of networks, especially the worldwide backbone network. Envisioned, in particular, are means for controlling systems for monitoring and filtering of non-conforming risk objects, as e.g. underwriting risk-transfer objects, and also for monitoring the workflow of the underwriting system by capturing workflow objects in the underwriting process flow, which do not have the drawbacks of the prior art. In particular, it is an object of the present invention to provide a monitoring and control system that is better capable of capturing the external and/or internal factors that may affect the pooled risk of the automated insurance system and that can further affect the processing of an object within an automated underwriting workflow. Furthermore, it is an object of the present invention to provide a system that is capable of being operated by monitoring and recognizing non-conforming objects, thereby reacting to externally or internally occurring boundary conditions or constraints. Furthermore, it is an object of the present invention to provide a system that is able to dynamically react to changing environmental or internal conditions or measuring parameters, which are possibly not known or predictable during the process of risk pooling; i.e., the underwriting process, in particular, for recognizing, measuring and classifying automatically, i.e. monitoring non-conforming risk-transfer underwriting objects based on their level of non-conformity.

According to the present invention, these objects are achieved particularly by the features of the independent claims. In addition, further advantageous embodiments can be derived from the dependent claims and their description.

According to the present invention, the above-mentioned objects for controlling and monitoring insurance underwriting systems with regard to risk exposed components are achieved, in particular, by controlling and monitoring the underwriting workflow of the underwriting system and/or the portfolio of pooled risk-transfer objects, wherein workflow objects are captured in the underwriting process flow and/or in a source of pooled risk-transfer objects, and wherein an activation of additional process states is triggered upon the detection of non-conforming workflow objects within the process flow and/or pooled risk-transfer objects of the portfolio source by means of the control and monitoring system, and in that a plurality of block elements is generated based on predefined boundary conditions provided by an automated underwriting system, wherein the block elements are triggerable parts of workflow objects and comprise one or more of interconnectable search terms and/or meta-data, and wherein the block elements are assigned to a recognition block-map and stored by means of a first searchable data structure provided by a first database, and in that the system comprises a second database providing a second searchable data structure for storing a plurality of workflow objects, and wherein the stored workflow objects of the second database are at least partly generated based on definable boundary condition parameters and/or based on historical workflow objects, and in that a workflow object is captured within the workflow pathway by means of the measurement and monitoring system, and wherein the system comprises a core engine with a recognition module for scanning the captured workflow object and thereby recognizing and identifying block elements of the stored recognition block-map in the captured workflow object, and in that, based on the filtered block elements of the captured workflow object, a proximity factor relative to each of the stored workflow objects of the second database is determined, wherein a corresponding proximity factor is measured by matching recognized block elements of the captured workflow object with block elements of a workflow object of the second database, thereby providing the measure for the proximity of the two workflow objects based on the mutually allocatable block elements, and in that a conformity index is generated and assigned to the captured workflow object based on the conformity of the recognized block elements with the stored block elements of the first searchable data structure, and based on the conformity of the recognized block elements with workflow objects of the second database, and wherein only workflow objects within a predefined range of the proximity factor are selected for generating the conformity index, and wherein the conformity index provides a measure for the conformity of the captured workflow object with the predefined boundary conditions of the automated underwriting system, and in that the additional process states are triggered and assigned to the process flow by means of a process management engine of the measurement and monitoring system when the measured conformity index exceeds a risk threshold value by means of the trigger module. For the purpose of recognizing and identifying block elements by means of the recognition module, the captured workflow object can, e.g., be content-scanned by means of the recognition module, triggering block elements of the workflow objects by means of the stored block elements of the first searchable data structure, and wherein triggered block elements of the captured workflow object are classified by means of a classification module, and wherein associated entities are extracted by means of an entity extraction module, and wherein detected search terms of the workflow object are flagged by means of a key-word flagging module. The plurality of block elements can, e.g., be generated based on predefined boundary conditions provided by an automated underwriting system, generated by at least partially extracting data from historical and/or simulated data. The one or more of the interconnectable search terms and/or meta-data can, e.g., be extracted and/or generated at least partially from historical and/or simulated data. The stored workflow objects of the second database can, for example, be at least partially generated based on definable boundary condition parameters, selecting block elements from the first database and/or extracting workflow objects from historical workflow objects' data. The corresponding proximity factor can, e.g., be measured by matching recognized block elements of the captured workflow object with block elements of a workflow object of the second database, thereby providing the measure for the proximity of the two workflow objects based on the mutually allocatable block elements, and/or their degree of conformity. As a variant, based on the filtered block elements of the captured workflow object, a proximity factor with regard to each of the stored workflow objects of the second database can, e.g., be determined, wherein a corresponding proximity factor is measured by matching recognized block elements of the captured workflow object with block elements of a workflow object of the second database, thereby providing the measure for the proximity of the two workflow objects based on the number of mutually allocatable block elements, and/or their degree of conformity. As a further variant, the conformity index can, e.g., be generated and assigned to the captured workflow object based on the conformity of the recognized block elements relative to the stored block elements of the first searchable data structure and based on the conformity of the recognized block elements with workflow objects of the second database, and wherein the conformity index provides a measure for the variance of the captured workflow objects with the predefined boundary conditions of the automated underwriting system. As another variant, the control system and the runtime execution devices can, e.g., interact in runtime, wherein the underwriting workflow object can be processed, based on a dynamically adapted process flow, with the generated process tasks by executing the activated process tasks by means of the runtime execution devices based on the transmitted control and steering signaling. A first-tier execution of the control system can, e.g., comprise the generation of the process states, and a second-tier execution of the control system can, e.g., comprise the generation and association of the additional process states and/or tasks, upon measuring the conformity index exceeding the risk threshold value by means of the trigger module, and wherein the processing of the workflow object and the appropriate signaling by the control system is dynamically adapted by alternating operating parameters of the runtime execution devices. Furthermore, the capturing means can, e.g., comprise measuring devices and/or measuring sensors for capturing the state parameters and/or task parameters of the workflow object. The workflow objects can, e.g., be captured via a plurality of input devices that are accessible by risk exposed components and/or automated insurance systems for dynamically adapting the workflow objects via the interface module and/or network based on appropriate signal generation by means of the signaling module of the control system. At least parts of task parameters of the process tasks of the additional process states can, for example, be dynamically generated by the control system based on the measured conformity index of the captured workflow object. Appropriate signaling can, e.g., be generated by means of the signaling module for steering the execution devices that process the selected object according to the process flow and/or additional process flow generated by the control system. The processing of the captured workflow object can, e.g., be monitored by means of dedicated monitoring and/or measuring devices of the control system based on at least the captured state parameters, the tasks parameters and/or operating parameters. The invention has, inter alia, the advantage that an underwriting workflow object can be processed in an automated process flow, wherein the process flow can be fully controlled and operated by the monitoring and control system. Furthermore, a dynamic assignment of operating parameters allows for the dynamic adaptation of the underwriting process during the processing of a captured object; i.e., an object processed in the underwriting process flow.

This also has the advantage that the control system, which is implemented as a dynamically adaptable system, can be automatically optimized without any additional technical or human intervention. The present monitoring and control system for state-transition-controlled processing of objects for responsive process management allows operators to have real-time visibility of their processes (executing them both within and externally of the platform), for the purpose of monitoring and dynamically adapting their underwriting processes, executing these processes by execution-type devices and appropriate signaling to those devices, sensing and responding to external events, and by incrementally improving these processes. This is not possible with the systems that are provided by the prior art. Furthermore, the monitoring and control system allows a structuring of facultative and contract covers (risk coverage, wordings, terms, and conditions) by means of the appropriately adjusted underwriting objects, identification of capacity markets and/or placement of both outward and/or inward conditions. In the context of the underwriting process itself, the system allows for a fully automated customization of risk transfer pooling; i.e., insurance system solutions, offered in a controlled way, and which are simple, with competitive wording and rates, as well as easy to administer and control. The system allows, in a self-adapting way, to improve the "experience" in structuring and placing risk transfer solutions; i.e., insurance and reinsurance systems. Finally, by means of the constant monitoring and control of the pooled risk portfolio, the inventive system allows for ensuring the operational capacity of the insurance system for covering losses occurring as an impact related to transferred risk, thereby minimizing the required pooled resources for the risk transfer. Therefore, the system also allows for monitoring the effectiveness of automated (re)insurance systems, and for automatically optimizing retention, required limits and provided coverage, etc. by providing self-adapting, optimized and automated actuarial modeling, claims, accounting and contract wording services.

In one embodied variant, the underwriting process flow of the underwriting system is based on state-transition-controlled processing of workflow objects, and wherein, by means of a control system, an object is selected and processed following the state-structured process flow comprising a plurality of process states, and wherein, for each process state, one or more process tasks are executed by means of the control system, and wherein the selected object is processed from one process state to reach a subsequent process state. State parameters of a workflow object can, e.g., be captured by capturing means of the control system, and a process state can, e.g., be determined based on the captured state parameters, and they can be assigned to the selected object, wherein, based on the determined process state and/or state parameters of the workflow object, at least one process task is generated by means of the control system for a specific process state. Furthermore, a generated process task can, e.g., be activated as a function of task parameters that are assigned to a process task. The process flow can, e.g., be dynamically operated by the control system, wherein, by means of the control system, an underwriting workflow object is processed from the determined process state to reach a subsequent process state by executing the assigned process tasks. The underwriting process flow can be, e.g., dynamically generated and adapted, wherein the workflow object is processed by means of the control system that initiates a subsequent process state by triggering defined trigger values of the task parameters and/or state parameters of the preceding process state. For the subsequent state transition within the process flow, upon measuring a non-conforming workflow object, the subsequent process task can, e.g., be split into subtasks, and wherein a subtask is generated by the control system to provide the additional process states, which are triggered and assigned to the process flow upon arriving at a measurement by the conformity index that exceeds the risk threshold value, by means of the trigger module. This embodied variant has, inter alia, the advantage that an underwriting workflow object can be processed in a state-structured underwriting process flow, wherein the state-structured process flow can be fully controlled and operated by the monitoring and control system. Furthermore, it has the advantage that applied process tasks of a process state of the underwriting process flow can be further controlled by means of the assigned operating parameters, wherein operational constraints or the splitting of specific tasks can be controlled by the monitoring and control system by means of the operating parameters. The dynamic assignment of operating parameters allows for a dynamic adaptation of the process flow during the processing of a captured workflow object; i.e., an object processed in the underwriting process flow. This also has the advantage that the monitoring and control system implemented as a dynamically adaptable system can be automatically optimized without any additional technical or human intervention. The present control system for state-transition-controlled processing of underwriting workflow objects with regard to responsive process management allows operators real-time visibility of their processes (executing the same both within and externally to the platform), for modeling and dynamically adapting their underwriting processes and associated transferred risks, executing these processes by execution devices and appropriate signaling means to those devices, sensing and responding to external events, and by incrementally improving these processes. This is not possible with the systems as known from the prior art. Furthermore, this embodied variant has, inter alia, the advantage that any processing of an object can be handled fully automatically by means of the monitoring and control system. In that way, the control system can automatically control, steer and operate the underwriting processing of workflow objects within the process flow based on the different state transitions of the selected object, and wherein the monitoring and control system can, e.g., process the objects by means of steering and signal transmission to the execution modules or devices.

In a further embodied variant, the control system comprises an historical engine device, wherein historical data of processed workflow objects associated with known risk parameters are stored in a storing device of the control system, and wherein the stored historical data are compared to the present workflow object, and whereby relevant historical workflow object data are filtered from the stored data by means of a filter-module, wherein the historic engine device and the control system are connected by a data link for data signaling transmissions between the control system and the historical engine device, and wherein the state-structured process flow is dynamically generated by the control system, and the captured workflow object is dynamically processed based on the data signaling transmission from the historical engine device and the process management engine of the control system. This embodied variant has, inter alia, the advantage that the control system provides an improved process flow based on the comparison with historical data. This also allows for an automatic adaptation and optimization of the system and the generated process flow, which is not possible in this manner by systems known from the prior art.

In another embodied variant, the underwriting process flow is a discrete time-stochastical control process, wherein the control system comprises a stochastical rating module, and wherein each initiation of the next process tasks is based at least on the selection of the process tasks of the preceding process state and an additional rating by means of the stochastical rating module. This embodiment variant has, inter alia, the advantage that the monitoring and control system can generate and adapt the process flow automatically and also steer and operate external devices by appropriate signal generation, when a measurement is obtained indicating that the conformity index exceeds the risk threshold value, and which is taken by means of the trigger module.

In yet another embodied variant, the control system is self-adapting by the automatic capturing of processed workflow objects after finishing the processing by means of the underwriting process flow, wherein the content of the second database is dynamically altered, storing the captured and processed workflow object by means of the second searchable data structure of the second database. This embodied variant has, inter alia, the advantage that any processing of an object can be handled fully automatically and without any further external interaction. Furthermore, the embodied variant has the advantage that the monitoring and control system can be operated in a self-adapting way, reacting automatically to the overall pooled risks by the underwriting objects that are associated with the corresponding risk transfer.

In one embodied variant, control and steering signaling is generated by means of a signaling module and transmitted to associated runtime execution modules via the runtime interfaces, wherein the workflow object is processed by executing the activated process tasks by means of the runtime execution modules based on the transmitted control and steering signaling, and wherein the process tasks are generated by means of process task engines. This embodiment variant has, inter alia, the advantage that non-conforming objects can be adjusted directly by means of the monitoring and control system.

In one embodied variant, the automated underwriting system dynamically adapts the overall risk that is pooled from the risk exposed components by adapting the predefined boundary conditions that reflect the overall risk appetite of the automated underwriting system. This embodied variant has, inter alia, the advantage that the overall associated and pooled risk of an automated insurance system can be dynamically controlled and monitored by the automated insurance system by means of the control and monitoring system.

In yet another embodied variant, the block elements comprise, in addition to the one or more of interconnectable, search terms and/or meta-data, a variable weighting parameter, and wherein each block elements and/or conformity thereof with the stored block elements and with the recognized block elements with workflow objects is weighted by the variable weighting parameter in order to generate the conformity index. This embodied variant has, inter alia, the advantage that the weighing parameters allow for incorporating functional relationships of the risk associated with a specific underwriting object and/or a triggerable block element, which is transferred to and pooled by the automated insurance system, and with the incorporation of a specific block elements in the object.

According to the present invention, the above-mentioned objects for controlling and monitoring of insurance underwriting systems for risk exposed components are obtained, furthermore, in particular, in that a portfolio of risk transfer objects of the underwriting system is monitored by consecutively capturing risk transfer objects from the portfolio of pooled risk-transfer objects, and wherein an activation of additional process states is triggered upon the detection of non-conforming workflow objects within the process flow by means of the control and monitoring system, and in that a plurality of block elements is generated based on predefined boundary conditions provided by an automated underwriting system, and wherein the block elements are triggerable parts of risk-transfer objects and comprise one or more of interconnectable search terms and/or meta-data, and wherein the block elements are assigned to a recognition block-map and stored by means of a first searchable data structure provided by a first database, and in that the system comprises a second database that provides a second searchable data structure for storing a plurality of risk-transfer objects, wherein the stored risk-transfer objects of the second database are at least partly generated based on definable boundary condition parameters and/or generated based on historical risk-transfer objects, and in that a risk-transfer object is captured within the workflow pathway by means of the measurement and monitoring system, and wherein the system comprises a core engine with a recognition module for scanning the captured risk-transfer object thereby recognizing and identifying block elements of the stored recognition block-map in the captured risk-transfer object, and in that, based on the filtered block elements of the captured risk-transfer object, a proximity factor relative to each of the stored risk-transfer objects of the second database is determined, and wherein a corresponding proximity factor is measured by matching recognized block elements of the captured workflow object with block elements of a workflow object of the second database, providing the measure for the proximity of the two workflow objects based on the mutually allocatable block elements, and in that a conformity index is generated and assigned to the captured risk-transfer object based on the conformity of the recognized block elements with the stored block elements of the first searchable data structure and based on the conformity of the recognized block elements with risk-transfer objects of the second database, and wherein only workflow objects within a predefined range of the proximity factor are selected for generating the conformity index, and wherein the conformity index provides a measure of the conformity of the captured workflow object with the predefined boundary conditions of the automated underwriting system, and in that the process states are triggered and assigned to the process flow by means of a process management engine of the measurement and monitoring system, when the conformity index is measured as exceeding a risk threshold value, by means of the trigger module. The captured workflow object can be content-scanned by means of the recognition module for the purpose of recognizing and identifying block elements by means of the recognition module, for example, and for triggering block elements of the workflow objects by means of the stored block elements of the first searchable data structure, and wherein triggered block elements of the captured workflow object are classified by means of a classification module, and wherein associated entities are extracted by means of an entity extraction module, and wherein detected search terms of the workflow object are flagged by means of a key-word flagging module. The present embodiment of the invention has, inter alia, the same advantages as the preceding embodied variants of said invention. In particular, it allows for monitoring and filtering the pooled risk-transfer objects; i.e., the pooled portfolio of risks by means of the insurance system (20,21) in a fully automated manner, and, moreover, to dynamically adapt the pooled risks by capturing objects based on their rate of non-conformity.

Finally, the present invention is not restricted to a system and method for a pattern-recognition-based control and monitoring system for "insurance underwriting systems" providing risk sharing for risk exposed components, but can explicitly be applied as an appropriate system for the automated management, control and monitoring of financial contracts. The invention generally can be realized for automated systems for pattern-recognition-based control and monitoring to all kind of data sets, comprising sensitive and recognizable data. Such systems and sensitive data can e.g. comprise the control and monitoring of the following broad categories, i.e. (i) financial data systems, wherein the types of financial data are numerous, but can e.g. include credit card account numbers and tracking data, bank account numbers and associated financial information, and a variety of credit-related data on individuals and businesses. Such pattern-recognition-based control and monitoring financial systems can e.g. also be provided for automated monitor and control the compliance or consistency with various regulatory standards, as e.g. Sarbanes-Oxley in the Unites States, reporting financial data for public control systems. In that sense, the invention also provides a pattern-recognition-based controlling and monitoring financial system and/or an automated financial compliance system; (ii) health data monitoring systems; (iii) sensitive business data monitoring and controlling systems.

In addition to a system, as described above, and a corresponding method, the present invention also relates to a computer program product that includes computer program code means for controlling one or more processors of the control system in such a manner that the control system performs the proposed method; and it relates, in particular, to a computer program product that includes a computer-readable medium containing therein the computer program code means for the processors.

BRIEF DESCRIPTION OF THE DRAWINGS

The present invention will be explained in more detail below by way of example, with reference to the drawings in which.

DETAILED DESCRIPTION OF THE PREFERRED EMBODIMENTS

Figure 1:
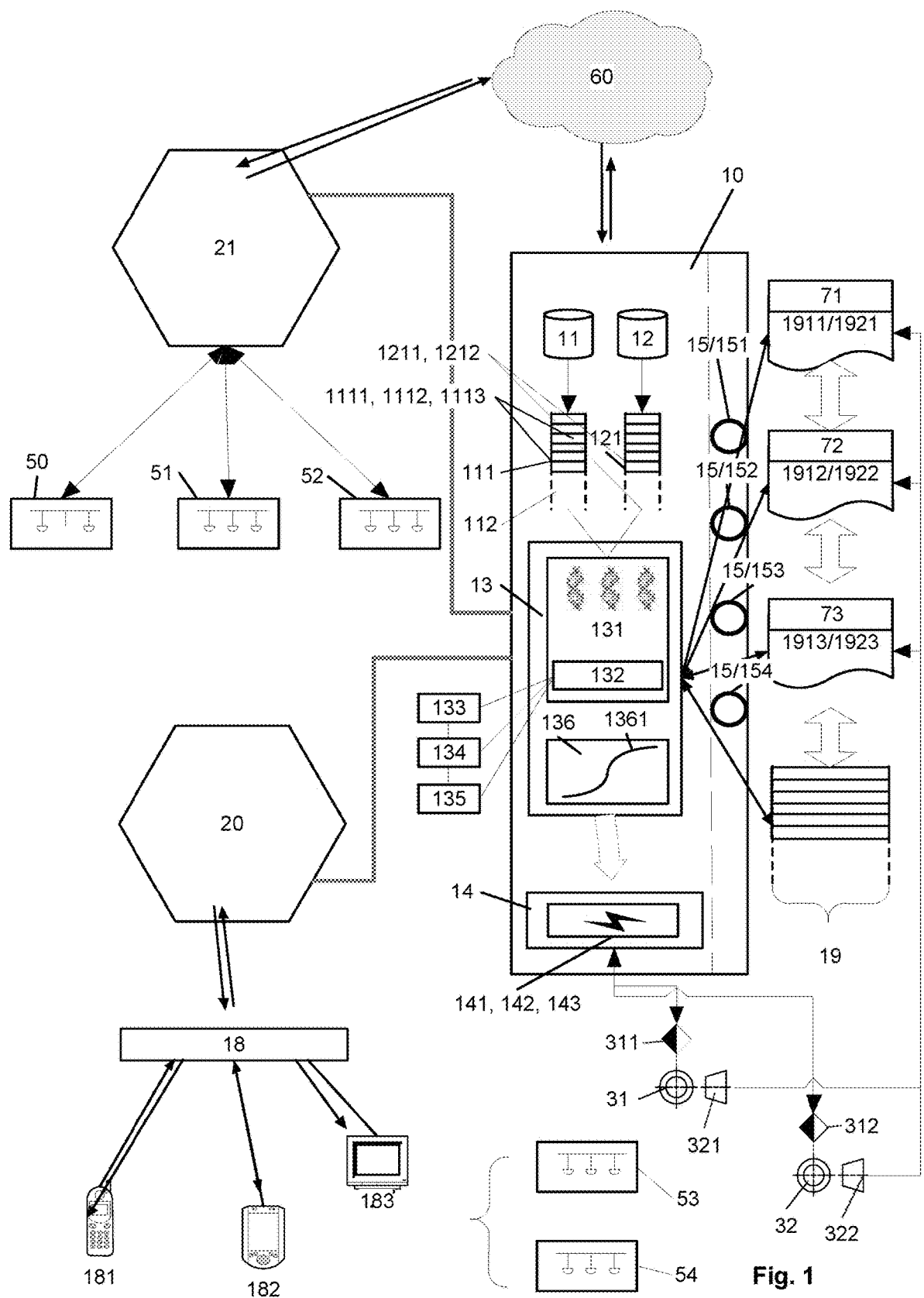
FIG. 1 shows a block diagram illustrating schematically an exemplary system according to the invention for a pattern-recognition based control and monitoring system 10 for insurance underwriting systems 20, 21 for risk exposed components 51, 52, 53, 54, wherein an underwriting workflow of the underwriting system 20, 21 and/or the pooled risk-transfer objects are monitored by capturing underwriting objects 71, 72, 73 in the underwriting workflow 19 and/or by selecting one of the pooled underwriting objects 71, 72, 73 from the risk-transfer systems 20,21. An activation of additional process states 1911,1912,1913 is triggered upon the detection of non-conforming workflow risk-transfer objects 71, 72, 73 within the process flow 19 and/or risk-transfer objects 71, 72, 73 selected from the pooled risk-transfer objects by means of the control and monitoring system 10.
Figure 2:
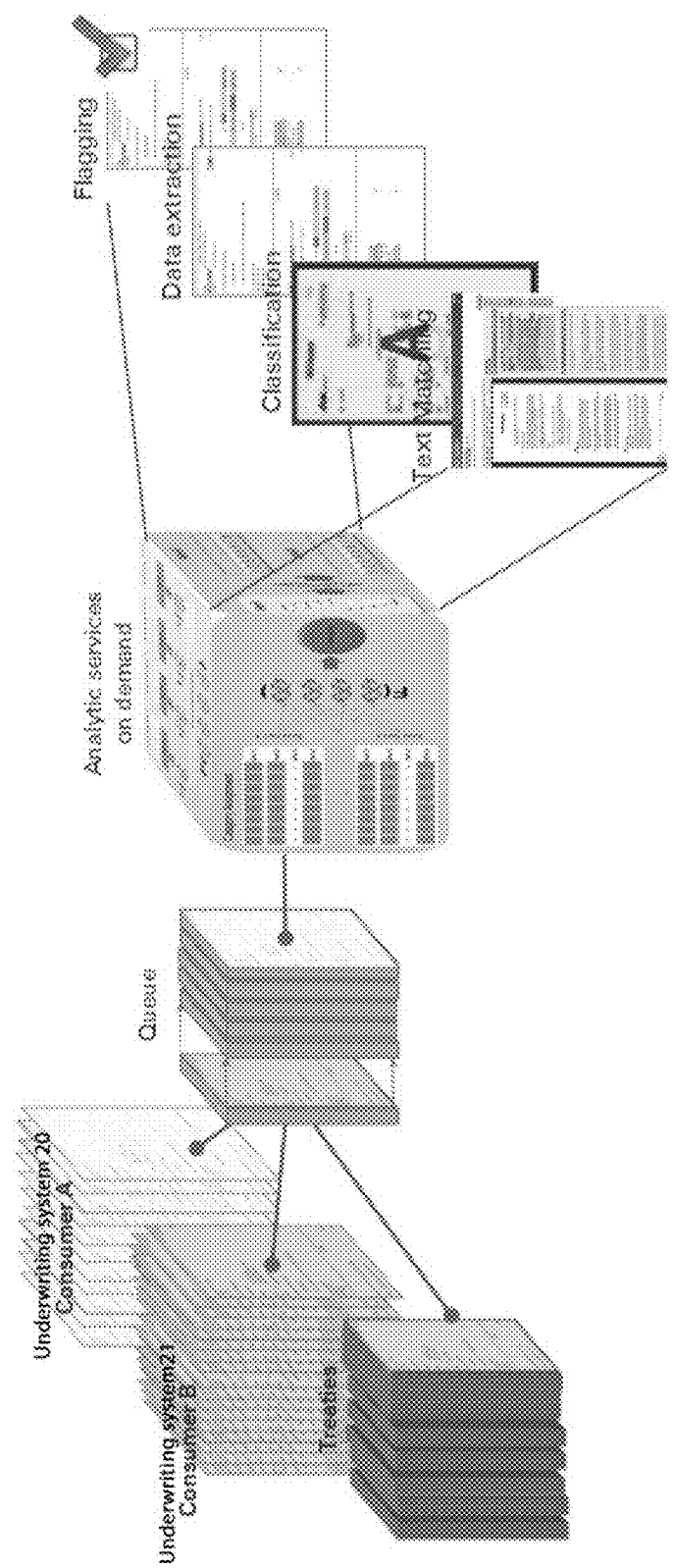
FIG. 2 shows a block diagram illustrating schematically an exemplary technical back-end framework of the recognition module 132 providing auto-classification, entity extraction and flagging of documents that match one or more scenarios, as defined by the control and monitoring system 10 by means of the classification module 133, entity extraction module 134, and key-word flagging module 135. The structure of the recognition module 132 is modular and flexible; and it is to be easily adaptable to the requirements involved in changing underwriting and risk-transfer condition parameters of different automated risk-pooling systems 20,21 and risk exposed components 50,51,52. Therefore, the structure is independent of specific underwriting conditions. The recognition module 132 is implemented, in particular, based on machine learning (ML) and/or statistical learning and/or bioengineering. The monitoring and control system 10 enables process automation through suggestive classification, auto-filing and notification of underwriting objects 71,72,73 related to one or more scenarios; i.e., based on predefined risk-transfer and/or underwriting boundary or condition parameters.
Figure 3:
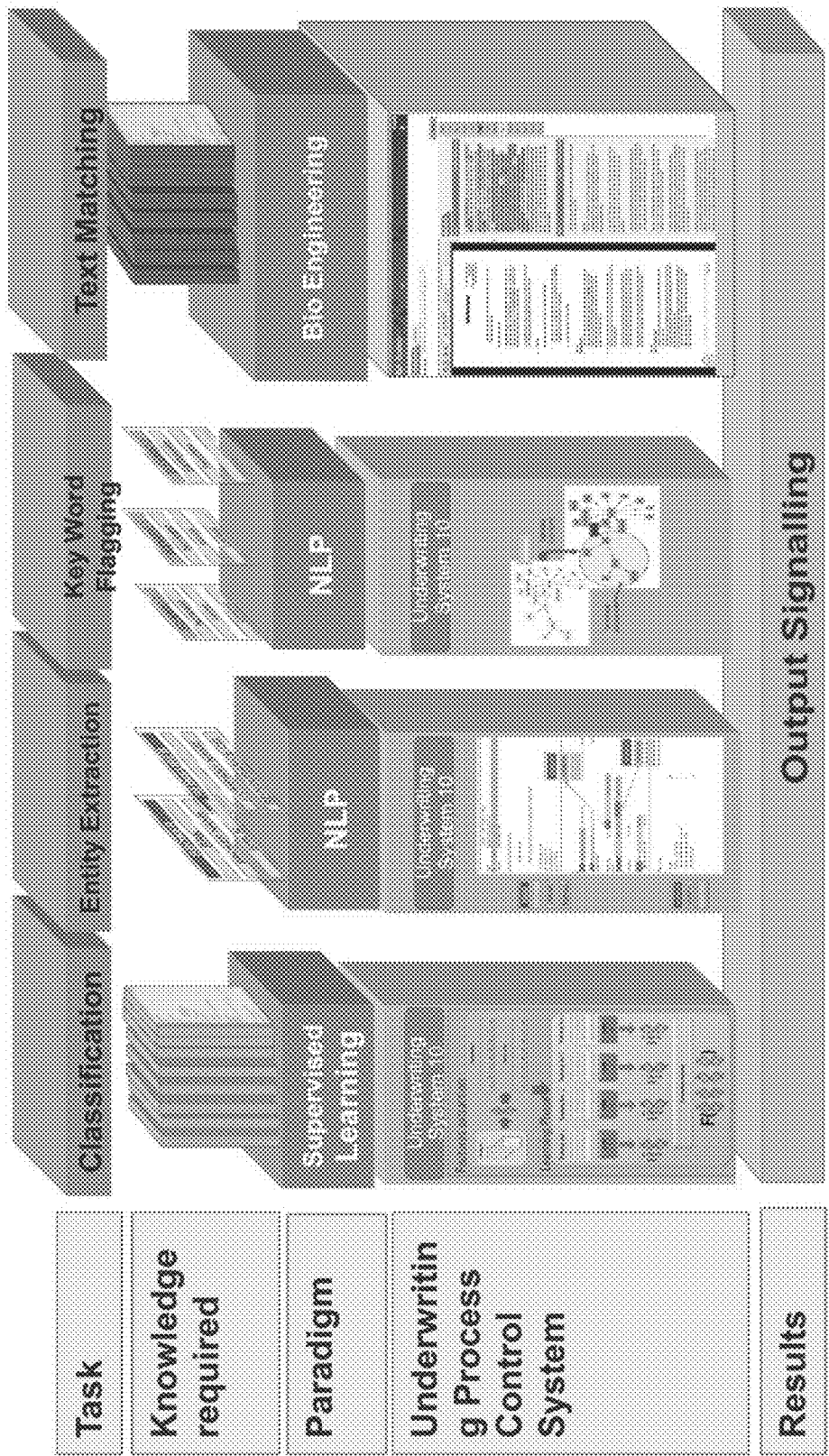
FIG. 3 shows a block diagram illustrating schematically an exemplary recognition flow as implemented by the recognition module 132. The modular framework allows for plug-in and plug-out of new data processing setups and/or algorithms and different applications with low implementation efforts. To improve flexibility, the signaling by means of the signaling module 14 can, e.g., be provided in a standard format using XML. The recognition module 132 can provide the block of text of target objects 71,72,73 with a very high degree of matching.
Figure 4:
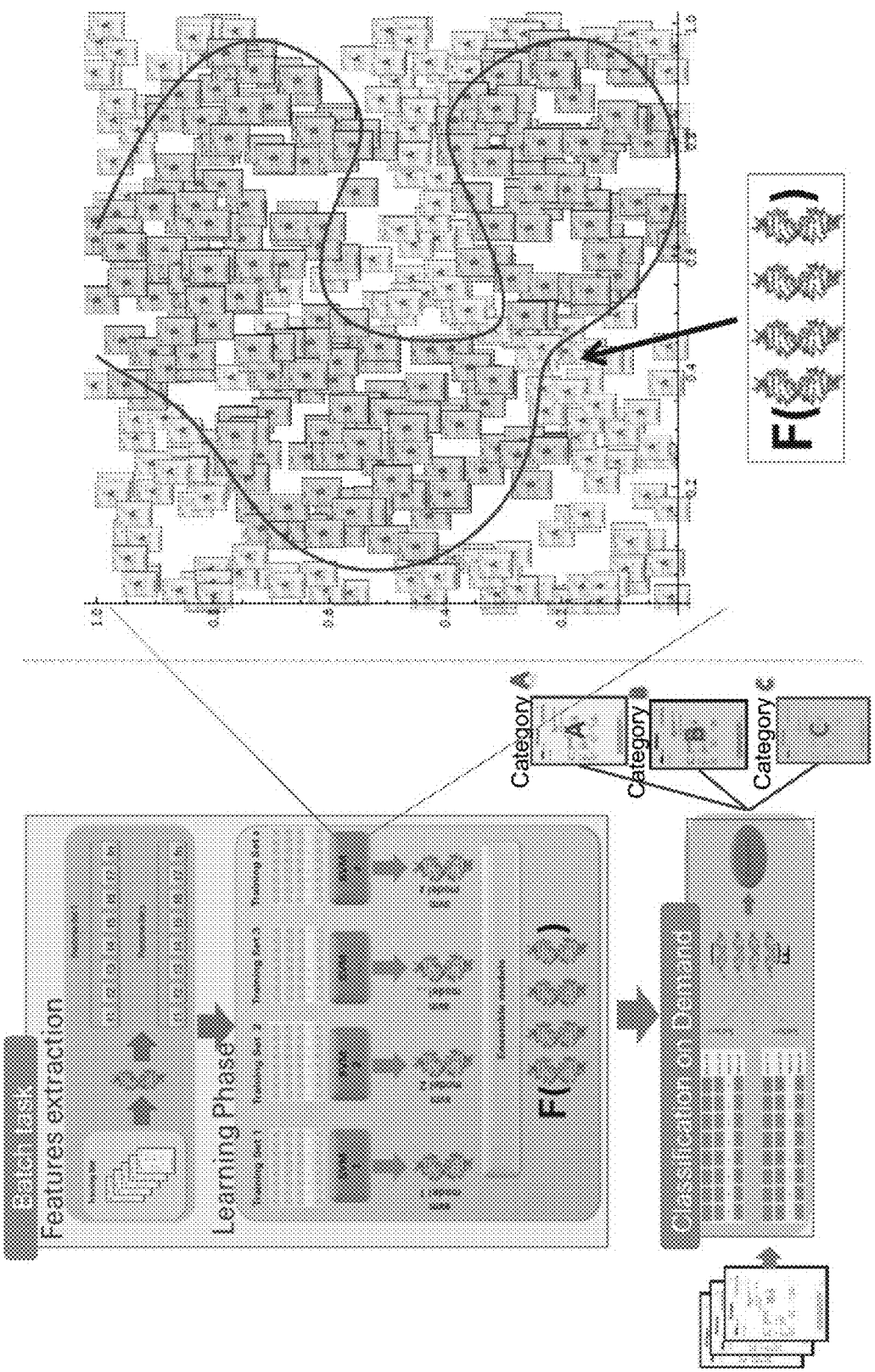
FIG. 4 shows a block diagram illustrating schematically an exemplary classification process, as implemented by means of the classification module 133.
Figure 5:
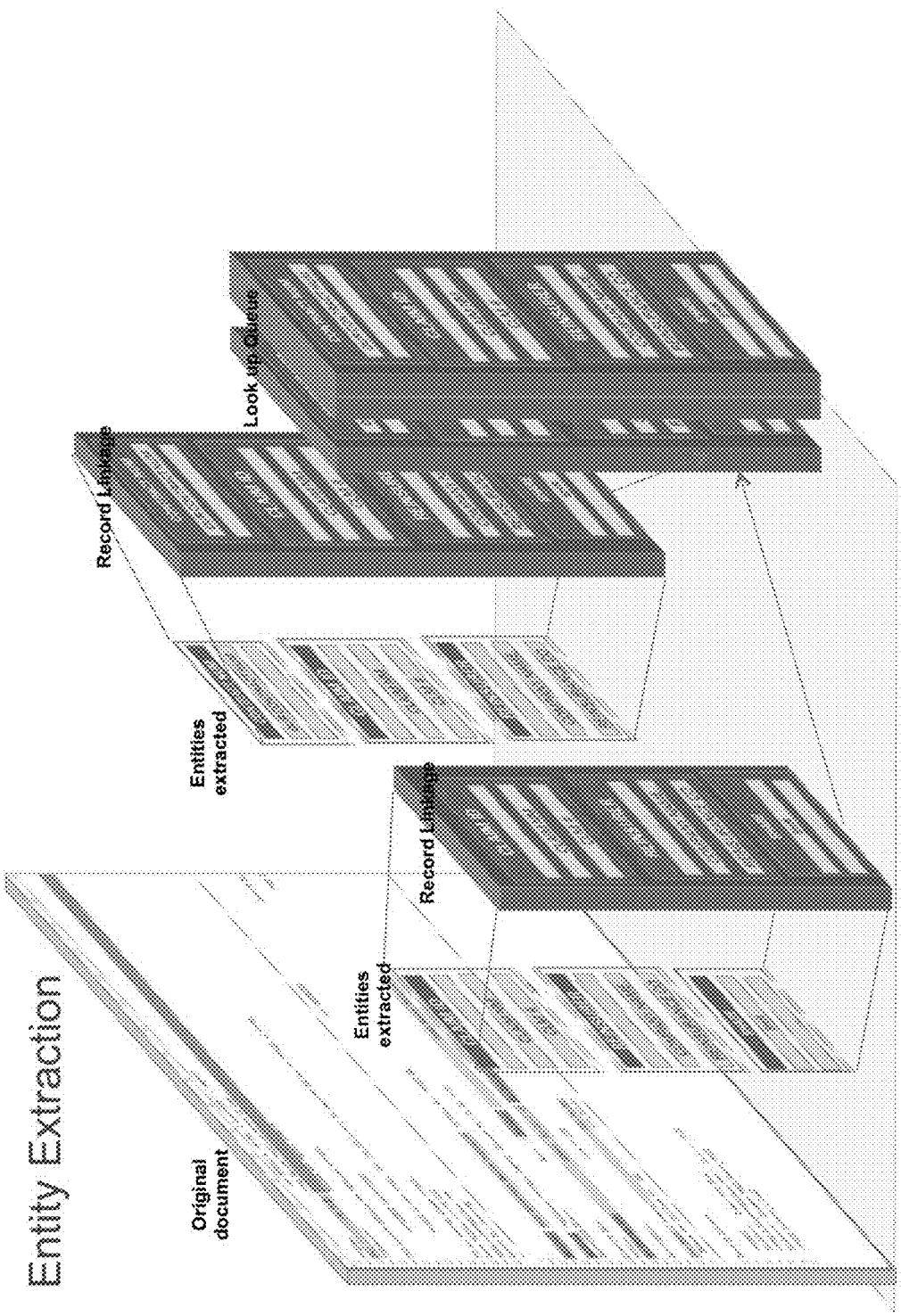
FIG. 5 shows a block diagram illustrating schematically an exemplary entity extraction process, as implemented by means of the entity extraction module 134.
Figure 6:
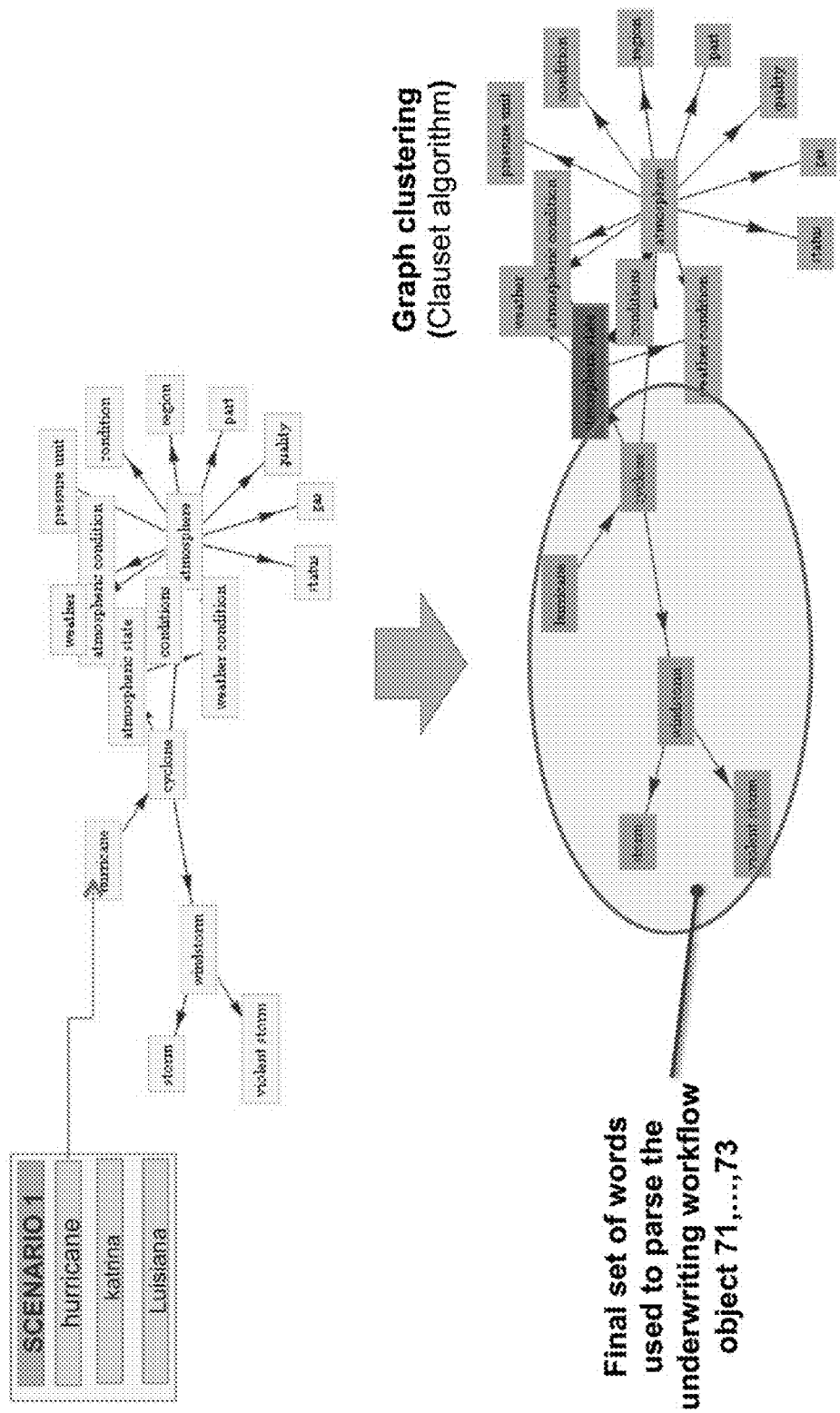
FIG. 6 shows a block diagram illustrating schematically an exemplary key-word flagging process, as implemented by means of the key-word flagging module 135.
Figure 7:
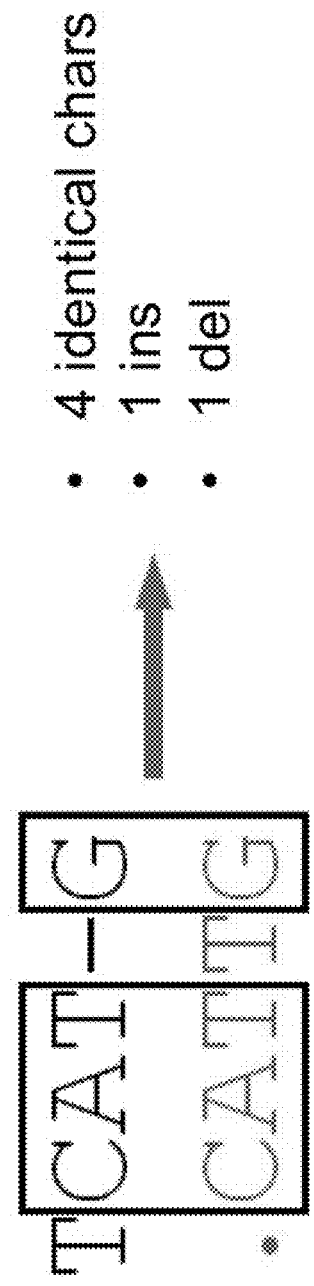
FIG. 7 shows a block diagram illustrating schematically an exemplary string alignment process, as implemented by means of the recognition module 132.
Figure 8:
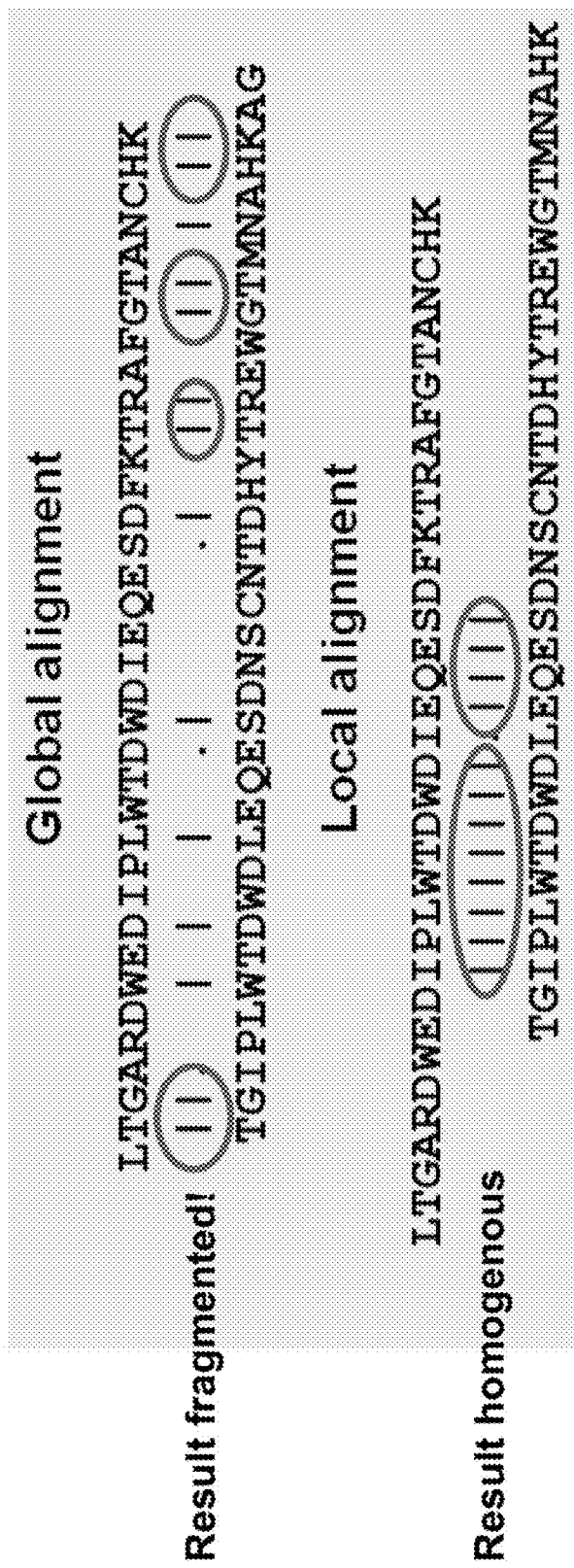
FIG. 8 shows a block diagram illustrating schematically an exemplary global alignment process and a local alignment process, as implemented by means of the recognition module 132.
Figure 9:
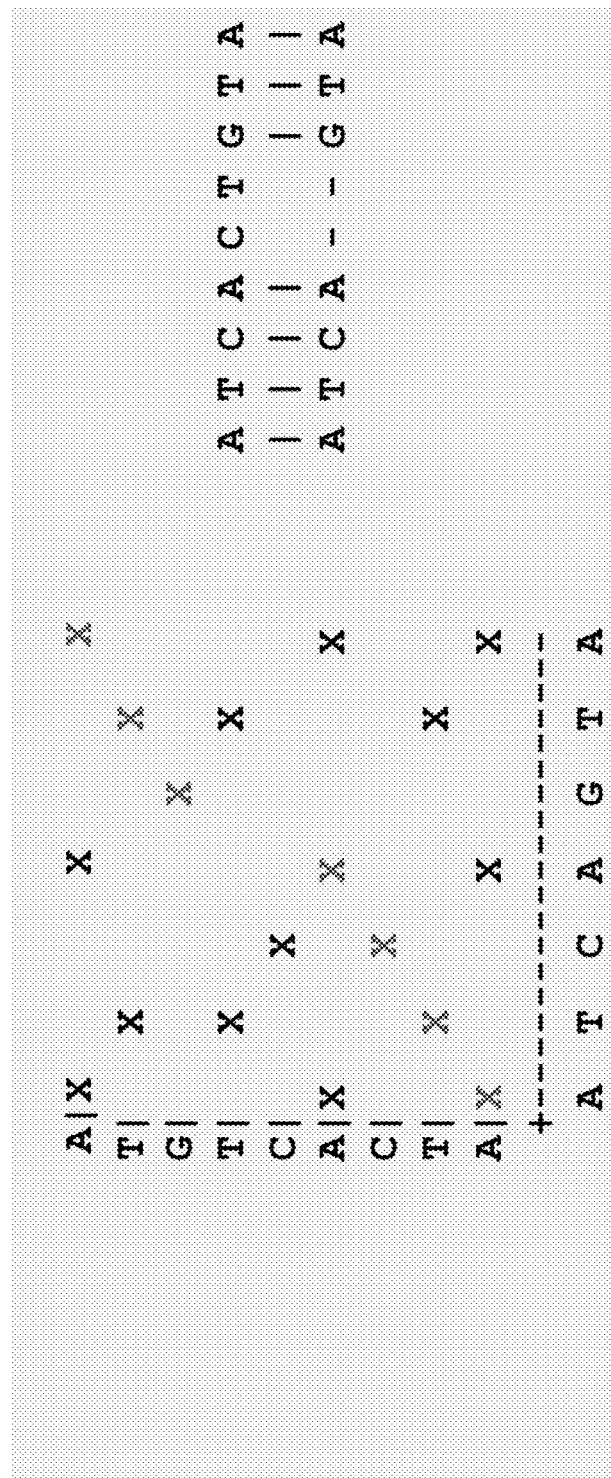
FIG. 9 shows a block diagram illustrating schematically an exemplary comparison process based on a dot-plot matrix, as, e.g., implemented by means of the recognition module 132.
Figure 10:
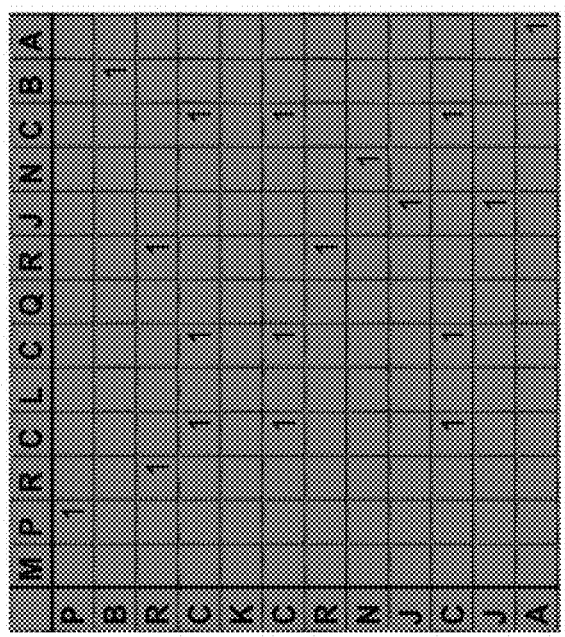
FIG. 10 shows a block diagram illustrating schematically an exemplary part of the recognition process, as implemented by means of the recognition module 132.

FIG. 1 schematically illustrates an architecture for a possible implementation of an embodiment of the pattern-recognition based control and monitoring system 10 for insurance underwriting systems 20, 21 for risk exposed components 51, 52, 53, 54 and/or for automated portfolio management systems of risk-transfer underwriting objects. In FIG. 1, reference numeral 10 refers to the inventive monitoring and control system. The monitoring and control system 10 is implemented based on underlying electronic components, steering codes and interactive interface devices such as, e.g., signal generation modules, or other module that interact electronically by means of the appropriate signal generation between the different modules, devices, or the like. An object 71,72,73 that is captured for controlling and monitoring by means of system 10 can comprise, e.g., at least one workflow object 71,72,73, which is processed in an automated underwriting process flow 19 enabling a specifically defined risk-transfer between the risk exposed components 51, 52, 53, 54 and the automated resource pooling system 20,21, i.e. the automated insurance system, wherein the object 71,72,73 is captured during the processing of the object 71,72,73 within the pathway of the underwriting workflow 19 or after finishing the automated workflow, i.e. processing of the underwriting object 71,72,73, by capturing the object(s) 71,72,73 from a source of already processed and pooled risk-transfer 71,72,73 of an automated underwriting and/or insurance system 20,21. An object 71,72,73 that is captured for controlling and monitoring by means of system 10 can also merely comprise, e.g., a risk-transfer object 71,72,73 from a source of pooled risk-transfer objects 71,72,73 of the automated insurance system 20,21; i.e., from the portfolio of risk-transfer objects 71,72, 73 as pooled by the resource pooling systems 20,21. In these cases, the monitoring and control system 10 is able to provide monitoring and filtering of non-conforming risk-transfer objects or underwriting objects 71,72,73, and activating of the appropriate signaling and/or further processing and adjusting and/or separating of these non-conforming measured objects 71,72,73. An object 71,72,73 is selected by means of a selecting or filtering module using the monitoring and control system 10; and it is processed following a recognition process as illustrated in FIGS. 2 to 10.

When the object 71,72,73 is captured in the underwriting workflow 19 of the underwriting system 20, 21, i.e. the object 71,72,73 is a processed workflow object 71,72,73 of an underwriting process of the automated insurance systems 20,21, the workflow 19 is monitored and controlled by capturing workflow objects 71, 72, 73 and by triggering activation of additional process states 1911,1912,1913 upon the detection of non-conforming workflow objects 71, 72, 73 within the process flow 19 by means of the control and monitoring system 10. However, the monitoring and control system 10 can also be applied to already processed and pooled objects 71,72,73, particularly by means of the automated insurance system 20,21, and wherein the overall risk that is pooled by the automated insurance system 20,21 is given by the overall pooled risk-transfer object 71,72,73; e.g., stored and assigned to the insurance systems 20,21 in an appropriate storage source of the automated insurance systems 20,21. In this case, the monitoring and control system 10 monitors and controls the corresponding portfolio of risk transfer objects 71,72,73 of the underwriting system 20, 21 by consecutively capturing risk transfer objects 71, 72, 73 of the portfolio of pooled risk-transfer objects 71, 72, 73 from the storage source, and wherein an activation of process states 1911,1912,1913 is triggered upon the detection of non-conforming risk-transfer objects 71, 72, 73 within the portfolio of pooled risk-transfer objects 71, 72, 73 by means of the control and monitoring system 10. In the following, the references to the objects 71,72,73 as workflow objects 71,72,73 or pooled risk-transfer objects 71,72, 73 are used interchangeably, and wherein a person skilled in the art understands that the control and monitoring system 10 can be applied in the above-described ways by way of monitoring objects 71,72,73 either during the underwriting process, or directly after the underwriting process, or as already processed objects 71,72,73 pooled in a portfolio of a source assigned to the automated insurance system 20,21.

For the implementation of the controlled underwriting process, for each underwriting process state 1911, 1912, 1913, one or more underwriting process tasks 1921, 1922, 1923 can be executed by the monitoring and control system 10 in order to process the workflow object 71,72,73 from one process state 1911, 1912, 1913 to a subsequent process state 1911, 1912, 1913. Changes in the process flow can be induced by the execution of one or a plurality of tasks. However, process and tasks can be independently implemented in the system, wherein possible relations between processes or process flows and the execution of one or more tasks are implemented as constraints. The process tasks 1921, 1922, 1923 do not have to be necessarily generated by the control and monitoring system 10; but they can, as in the embodied variant, also be inserted or imported from external sources, such as denoted databases with appropriate, predefined process tasks or input means, such as consoles for manual inputs, etc.

The underwriting process or workflow 19 comprises the technical and/or procedural steps required for executing the controlled processing of objects 71,72,73, in particular a state transition-controlled processing by means of the control and monitoring system 10. Furthermore, the system 10 comprises technical and other means for conducting the processing steps, and the transfer and flow of data/signaling between the means and/or steps for executing the process with regard to the objects 71,72,73. The objects 71,72,73 are processed by a set of processes or tasks that need to be carried out. Within an underwriting process flow 19, underwriting objects 71,72,73 pass through the different tasks 1921, 1922, 1923 and process states 1911, 1912, 1913 in the specified order, from start to finish; and the tasks 1921, 1922, 1923 are executed either by dedicated technical processing devices or means, or by specified functions that are generated by the monitoring and control system 10 instructing a processor device, or by dedicated signaling generation for the purpose of instructing performing activities/tasks on the underwriting workflow object 71,72,73. The monitoring and control system 10 comprises a process management engine 13 for executing the underwriting process flow 19. The generation of a specific process flow 19, i.e. the process management process definition, can be generated, e.g., based on a desired process in a process management generator of the process management engine 13. As described below, the process flow 19 can be generated dynamically (state by state) based upon at least measuring parameters of the capturing means 15,151, . . . , 154 and/or data transmitted via the interface module 18 and the input devices 181,182, 183, e.g., via input by the insurance systems 20,21 or the risk exposed components 51,52,53. In one embodied variant, the generated process flow 19 can, e.g., be dynamically or partly dynamically translated into a processor source code, such as, e.g. Java source code or the like, at a translator engine of the process management engine 13. The source code can then be compiled into a byte code in the context of a compiler engine of the process management engine 13. Finally, a virtual machine of the processing device or a processor-driven, -steered or -operated device of the monitoring and control system 10 can be configured for executing the byte code. Such devices can comprise execution devices of the process tasks 1921, 1922, 1923, such as, e.g., the runtime execution modules 30,31. Therefore, the process flow 19 is modeled and generated by means of the process management engine 13, including or based upon specific processing rules and technical instructions stored in a database. A person skilled in the art understands that the scope of the technical instructions must has to be constructed along broad lines, comprising all technically necessary information, data, specifications or operational parameters, such as to allow the processing rules to be executed by the system 10. Furthermore, at least parts of the parameters of the underwriting objects 71, 72, 73 can, e.g., be captured via a plurality of input devices 181,182,183 that are accessible to risk exposed components 51,52,53, and/or automated insurance systems 20,21 for dynamically adapting the workflow objects 71,72, 73 via the interface module 18 and/or network 60, based on the appropriate signal generation by means of the signaling module 14 of the control system 10. The network 60 can include a hard-wired or wireless network; e.g., the internet, a GSM network (Global System for Mobile Communication), an UMTS network (Universal Mobile Telecommunications System) and/or a WLAN (Wireless Local Region Network), and/or dedicated point-to-point communication lines.

The underwriting processing of the object 71,72,73 or the portfolio of pooled objects 71,72,73 can, e.g., be monitored by means of dedicated monitoring and/or measuring devices 15,151,152,153,154 of the monitoring and control system 10, particularly based on at least captured state parameters 1911, 1912, 1913 or the task-parameters 1921, 1922, 1923 of the underwriting workflow 19 of the object 71,72,73 and/or risk-transfer parameters that are associated with the underwriting object 71,72,73,74. The monitoring and control system 10 can be implemented using one or a plurality of visual front ends. The execution of the additional process states 1911, 1912, 1913 or the process tasks 1921, 1922, 1923 is controlled and/or steered and operated by means of the monitoring and control system 10 or by a dedicated process flow 19 execution engine that handles the call-up and signal generation of the remote devices or applications. For the additional underwriting process states 1911, 1912, 1913, executed non-conforming captured objects 71,72,73, the monitoring and control system 10 can, e.g., further comprise a double-tier structure, wherein the first-tier execution of the control system 10 comprises the generation of the additional process states 1911, 1912, 1913 and the second-tier execution of the control system 10 comprises the generation and association of the process tasks 1921, 1922, 1923, wherein the processing of the object 71,72,73 and the appropriate signaling 141,142,143 by the monitoring and control system 10 is dynamically adapted based on at least the alterable operating parameters of the associated process states 1911, 1912, 1913 or tasks 1921, 1922, 1923. The reference numeral 141 represents the appropriate signaling dedicated to the runtime execution module 30, 142, the signaling for runtime execution module 31, and so forth. Underwriting process state parameters of the captured object 71,72,73 can be captured by capturing means 151,152,153, 154 of the monitoring and control system 10, and a process state 1911, 1912, 1913 is determined based on the captured state parameters. The determined process state 1911, 1912, 1913 is assigned to the selected object 71,72,73 by the monitoring and control system 10. Upon triggering non-conformity of an object 71,72,73, based on the determined process state 1911, 1912, 1913 and/or state parameters of the captured object 71,72,73, at least one process task 1921, 1922, 1923 is generated by means of the monitoring and control system 10, wherein, for a specific process state 1911, 1912, 1913, a generated process task 1921, 1922, 1923 is activated as a function of the task-parameters assigned to a process task 1921, 1922, 1923. The control system 10, e.g., can generate one or more process tasks based on the process state 1911, 1912, 1913 of the selected object 71,72,73 in order to bring the object 71,72,73 in a predefinable rate of conformity. Measuring operations for the rate of conformity are described in detail below.

The monitoring and control system 10 generates a plurality of block elements 1112, 1113, 1114 based on predefined boundary conditions provided by an automated underwriting system 20, 21. The block elements 1112, 1113, 1114 form triggerable parts of workflow and/or underwriting objects 71, 72, 73 and comprise one or more of interconnectable search terms and/or meta-data, and wherein the block elements 1112, 1113, 1114 are assigned to a recognition block-map 111 and stored by means of a first searchable data structure 112 provided by a first database 11. The plurality of block elements 1112, 1113, 1114 can, e.g., be generated, inter alia, based on predefined boundary conditions provided by an automated underwriting system 20, 21 and by at least partially extracting data from historical and/or simulated data. Furthermore, the one or more of the interconnectable search terms and/or meta-data can, e.g., be extracted and/or generated at least partially from historical and/or simulated data. In addition, the block elements 1112, 1113, 1114 can, e.g., comprise the one or more of the interconnectable search terms and/or meta-data, a variable weighting parameter, and wherein each block element 1112, 1113, 1114 and/or its conformity with the stored block elements 1111, 1112, 1113 and with the recognized block elements with workflow objects 1211, 1212 is weighted by the variable weighting parameter in order to generate the conformity index. The weighing parameter allows for incorporating functional relationships of the risk that is associated with a specific underwriting object 71,72,73 and/or a triggerable block element 1111, 1112, 1113, which is then transferred to and pooled by the automated insurance system 20,21 with the incorporation of specific block elements 1111, 1112, 1113 in the object 71,72,73.

The system 10 comprises a second database 12 that provides a second searchable data structure 121 for storing a plurality of workflow objects 1211, 1212, wherein the stored workflow objects 1211, 1212 of the second database 12 are at least in part generated based on definable boundary condition parameters and/or historical workflow objects. The stored workflow objects 1211, 1212 of the second database 12 can, e.g., be at least in part generated based on definable boundary condition parameters selecting block elements 1112, 1113, 1114 from the first database 11 and/or extracting workflow objects from historical workflow objects' data.

A workflow object 71, 72, 73 is captured within the workflow pathway 19 or from a portfolio of risk-transfer objects 71,72,73, which is stored in a storage source of the insurance system 20,21, by means of the measurement and monitoring system 10. For the captured underwriting objects 71,72,73, the system 10 comprises a core engine 131 with a recognition module 132 for scanning the captured workflow objects 71, 72 73, thereby recognizing and identifying block elements 1112, 1113, 1114 of the stored recognition block-map 111 in the captured workflow objects 71, 72, 73. The captured workflow object can, for example, be content-scanned by means of the recognition module 132 for recognizing and identifying block elements 112, 113, 114 by means of the recognition module 132, thereby triggering block elements of the workflow objects 71, 72, 73 by means of the stored block elements of the first searchable data structure 111. Triggered block elements of the captured workflow object 71,72,73 are classified by means of a classification module 133. Further associated entities are extracted by means of an entity extraction module 134 and detected search terms of the workflow object are flagged by means of a key-word flagging module 135.

Based on the filtered block elements of the captured workflow object 71, 72, 73, a proximity factor regarding each of the stored workflow objects 1211, 1212 of the second database 12 is determined, wherein a corresponding proximity factor is measured by matching recognized block elements of the captured workflow object 71, 72, 73 with block elements 1211, 1212 of a workflow object 1211, 1212 of the second database 12, thereby providing the measure for the proximity of the two workflow objects based on the mutually allocatable block elements. The corresponding proximity factor can, e.g., be measured by matching recognized block elements of the captured workflow object 71, 72, 73 with block elements 1211, 1212 of a workflow object of the second database 12, thus providing the measure for the proximity of the two workflow objects based on the mutually allocatable block elements and/or their degree of conformity. Furthermore, based on the filtered block elements 1211, 1212 of the captured workflow object 71, 72, 73, the proximity factor regarding each of the stored workflow objects 1211, 1212 of the second database 12 can, e.g., be determined, and wherein a corresponding proximity factor is measured by matching recognized block elements of the captured workflow object 71, 72, 73 with block elements of a workflow object 1211, 1212 of the second database 12, thus providing the measure for the proximity of the two workflow objects based on the number of mutually allocatable block elements and/or their degree of conformity.

A conformity index is generated and assigned to the captured workflow object 71, 72, 73, respectively based on the conformity of the recognized block elements with the stored block elements 1111, 1112, 1113 of the first searchable data structure 111 and based on the conformity of the recognized block elements with workflow objects 1211, 1212 of the second database 12, and wherein only workflow objects 1211, 1212 within a predefined range of the proximity factor are selected for generating the conformity index. The conformity index provides a measure for the conformity of the captured workflow object 71, 72, 73 within the predefined boundary conditions of the automated underwriting system 10. The conformity index can, for example, be generated and assigned to the captured workflow object 71, 72, 73 based on the conformity of the recognized block elements with the stored block elements 1111, 1112, 1113 of the first searchable data structure 111 and based on the conformity of the recognized block elements with workflow objects 1211, 1212 of the second database 12, wherein the conformity index provides a measure for the variance of the captured workflow object 71, 72, 73 within the predefined boundary conditions of the automated underwriting system 10.

The additional process states are triggered and assigned to the process flow 19 by means of a process management engine 13 of the measurement and monitoring system 10, when the conformity index is measured as exceeding a risk threshold value 141 as established by means of the trigger module 14. To provide the required signaling and self-driven interaction of the control and monitoring system 10 with other devices, control and steering signaling 141,142,143 is generated by means of a signaling module 14 and, for example transmitted to associated runtime execution modules 30,31 via the runtime interfaces 311, 312, wherein the workflow object 71,72,73 is processed by executing the activated process tasks 1921, 1922, 1923 by means of the runtime execution modules 30,31 based on the transmitted control and steeling signaling 141,142,143, and wherein the process tasks 1921, 1922, 1923 are generated by means of process task engines 312, 322. Based on the signaling of the monitoring and control system 10, the automated underwriting system 20, 21 can, e.g., be dynamically adapting, in particular in a self-adapting way an overall risk that is pooled from the risk exposed components 51, . . . 54 by adapting the predefined boundary conditions reflecting the overall risk appetite of the automated underwriting system 20, 21. This level of self-adjustment and automated control is not reached by any of the known systems of the prior art.

In one embodied variant, the underwriting process flow 19 of the underwriting system 20, 21 is based on state-transition-controlled processing of workflow objects 71,72, 73. In this embodied variant, an object 71,72,73 is selected by means of the monitoring and control system 10 and processed following the state-structured process flow 19 comprising a plurality of process states 1911,1912,1913; and for each process state 1911,1912,1913 one or more process tasks 1921,1922,1923 are executed by means of the control system 10, and wherein the selected object 71,72,73 is processed from one process state 1911,1912,1913 to a subsequent process state 1911,1912,1913. State parameters of a workflow object 71,72,73 can, e.g., be captured by capturing means 15,151,152,153,154 of the monitoring and control system 10; and a process state 1911,1912,1913 is determined based on the captured state parameters and assigned to the selected object 71,72,73. Based on the determined process state 1911,1912,1913 and/or state parameters of the workflow object 71,72,73, at least one process task 1921, 1922, 1923 can be generated by means of the monitoring and control system 10 for a specific process state 1911,1912,1913. The generated process task 1911, 1921, 1923 can, e.g., be activated as a function of the task parameters assigned to a process task 1921, 1922, 1923. The capturing means 15 of the monitoring and control system 10 can comprise measuring devices and/or measuring sensors 151,152,153,154 for capturing the state parameters and/or task parameters of the workflow object 71,72,73.

In another embodied variant, the process flow 19 is dynamically operated by the monitoring and control system 10; wherein by means of the monitoring and control system 10, an underwriting workflow object 71,72,73 is processed from the determined process state 121,122,123 to a subsequent process state 1911,1912,1913 by executing the assigned process tasks 1921, 1922, 1923, 1924. The underwriting process flow 19 can, e.g., be dynamically generated and adapted, wherein the workflow object 71,72,73 is processed by means of the control system 10 that initiates a subsequent process state 1911,1922,1933 by triggering defined trigger values of the task parameters and/or state parameters of the preceding process state 1911,1922,1933. For the subsequent state transition within the process flow 19, the subsequent process task 1911, 1912, 1923 can, e.g., be split by means of subtasks, wherein a subtask is generated by the monitoring and control system 10 to provide the additional process states triggered and assigned to the process flow 19, when arriving at a measurement of the conformity index that exceeds the risk threshold value 141 by means of the trigger module 14. Finally, as an additional embodied variant, the monitoring and control system 10 comprises a historical engine device, wherein historical data of processed workflow objects associated with known risk parameters are stored in a storing device of the control system 10, and wherein the stored historical data are compared to the present workflow object 71, 72, 73, and relevant historical workflow object 71, 72, 73 data are filtered from the stored data by means of a filter-module, wherein the historical engine device and the monitoring and control system 10 are connected by a data link for data signaling transmission between the control system 10 and the historical engine device, and wherein the state-structured process flow 19 is dynamically generated by the control system 10 and the captured workflow object is dynamically processed based on the data signaling transmission from the historical engine device and the process management engine 13 of the control system 10. As mentioned, historical data of past underwriting objects 71,72,73 and of underwriting processes 19 are stored in a storing device of the monitoring and control system 10. The stored historical data are compared to the captured underwriting object 71,72,73; then, relevant historical object data and/or process flow data from the stored data are filtered by means of a filter module.

When a signal of non-conformity has been triggered within a predefinable range by means of the control and monitoring system 10, the monitoring and control system 10 and the runtime execution devices 30,31 can, e.g., interact in runtime, wherein the object 71,72,73 is processed based on the dynamically adapted process flow 19 with the generated process tasks 1921, 1922, 1923 by executing the activated process tasks 1921, 1922, 1923 by means of the runtime execution devices 30,31 based on the transmitted control and steering signaling 141,142,143. For example, a first-tier execution of the control system 10 can comprise the generation of the process states 1911,1912,1913 and a second-tier execution of the control system 10 can comprise the generation and association of the additional process tasks 1911,1912,1913, when a measurement has been taken, whereby the conformity index exceeds the risk threshold value 141, by means of the trigger module 14, and wherein the processing of the workflow object 71,72,73 and the appropriate signaling 141,142,143 by the control system 10 is dynamically adjusted by alternating operating parameters of the runtime execution devices 30,31. Furthermore, the monitoring and control system 10 can, e.g., be self-adapted by automatically capturing of processed workflow objects 71, 72, 73 after finishing the processing by means of the underwriting process flow 19, and wherein the content of the second database 12 is dynamically altered, storing the captured and processed workflow object 1211, 1212 by means of the second searchable data structure 121 of the second database 12.

At least parts of the task parameters of the process tasks 1921, 1922, 1923 of the additional process states 1911, 1912, 1913 can be dynamically generated by the control system 10 based on the measured conformity index of the captured workflow object 71,72,73. An appropriate signaling 141,142,143 can, e.g., be generated by means of the signaling module 14 for steering the execution devices 50,51,52 processing the selected object 71,72,73 according to the process flow and/or additional process flow 19 generated by the control system 10. Finally, the processing of the captured workflow object 71,72,73 can, e.g., be monitored by means of dedicated monitoring and/or measuring devices 30, 31 of the control system 10, particularly based on at least the captured state parameters, the tasks parameters and/or operating parameters.

As an embodiment variant, the workflow object 71, 72, 73 automatically can be assembled within the workflow pathway 19 by means of the additional process states, which are triggered and assigned to the process flow 19 by means of the process management engine 13 of the measurement and monitoring system (10), wherein by means of the system 10 based on a predefined structure by means of composing a plurality of block elements 1112, 1113, 1114 triggered within the first database 11.

In an even further embodiment variant at least one risk-importing recognized block element of the workflow object 71, 72, 73 is substituted by block elements 1112, 1113, 1114 triggered within the first database 11 improving the measured conformity index, wherein the block element of the workflow object 71, 72, 73 are substituted by means of the additional process states, which are triggered and assigned to the process flow 19 by means of the process management engine 13 of the measurement and monitoring system 10. Risk-importing recognized block elements of the workflow object 71, 72, 73 can automatically be substituted by block elements 1112, 1113, 1114 triggered within the first database 11 by means of the system 10, until the measured conformity index of the captured workflow object 71, 72, 73 is measured within the predefined boundary conditions of the automated underwriting system 10.

In summary, the system 10 provides an automated device for a broad range of automated functionalities, as e.g. (i) automated document review functionalities, as e.g. automatical display of critical comments when a stored block element, as a clause, is detected in a workflow object 71, 72, 73 (e.g. a document). The system 10 can e.g. generate visual metaphors for creating a "risk map" of a workflow object 71, 72, 73. The system 10 can also transmit the workflow object 71, 72, 73 to contract reviewers adapting the automatic result, and transform it into a generated contracts review; (ii) automated treasury functionalities, as the system 10 comprises the database 11 as a storage point providing and containing an up-to-date collection of all clauses in a portfolio, together with user-specific data, e.g. remarks, comments or views, on each. This feature can also be used as searchable platform for training as well as for ensuring consistency; (iii) automated check listing functionalities, as e.g. automatic generation of checklists of content, e.g. exclusion. This also can comprise automated generation of variable checklists per LoB (Line of Business) and/or per scope, as required e.g. by different underwriter groups, which has the advantage of saving work time of users by means of the automated generation; (iv) automated document comparison functionalities, as e.g. a workflow object 71, 72, 73, for example contract data, is captured an compared across a user specific portfolio or stored collection. In this way, similar workflow object 71, 72, 73 of the second database 12 are detected by the system 10 and the captured workflow object 71, 72, 73 automatically can be compared, in particular providing a measurable proximity factor and conformity index; (v) automated document search functionalities, as e.g. a free text search engine can be integrated into the system 10 providing free search for a workflow object 71, 72, 73 or a block element. For example, upon entering e.g. "Endorsement 5 WXL Liability Client X 2013 draft 3" in the integrated search engine, the system will create a link to the corresponding workflow object 71, 72, 73 or block element; (vi) automated content search functionalities, as e.g. a free text search engine can be integrated into the system 10 providing free search for block element as stored in the first and/or second database 11/12. Allowing content searches across the whole stored, workflow objects 71, 72, 73 or block elements, e.g. specified segments or inducted documents within a portfolio overview of a specific user; (vii) automated document benchmarking functionalities providing standardization indexing and automated workflow objects 71, 72, 73, e.g. contract, summaries by means of the system 10. This feature also allows benchmarking and segmentation for standard and non standard workflow objects 71, 72, 73; (viii) automated document drafting functionalities, wherein the system 10 assembles as workflow object 71, 72, 73 e.g. a draft contract based on a structured predefined "order form" while selecting only approved clauses for block elements; (ix) automated document re-drafting functionalities automatically improving captured workflow objects 71, 72, 73, for example inputting documents as workflow objects 71, 72, 73 assembled by third parties, thereby automatically substituting detected risk-importing block elements, as e.g. risk-importing clauses, by approved block elements. For control reasons, the substituted workflow objects 71, 72, 73 can e.g. be marked or otherwise labeled by the system 10.

The automated insurance systems 20,21 are implemented at least comprising an automated resource pooling system for pooling resources of the risk exposed components 51,52, 53, 54 in order to provide risk protection for the risk exposed components 51, . . . , 54 by means of the pooled resources based on the pooled risks associated with a underwriting object 71,72,73. The pooled resources can be, e.g., based on monetary parameters. The resource-pooling systems 20,21 can, e.g., comprise all the necessary technical means for electronic money transfers and association, as, e.g., initiated by one or more associated payment transfer modules via an electronic network 60. The monetary parameters can be based on any available electronic and transferable means, such as, e.g., e-currency, e-money, electronic cash, electronic currency, digital money, digital cash, digital currency, or cyber currency, etc., which can only be exchanged electronically. A payment data store of the automated insurance systems 20,21 can, e.g., provide the means for associating and storing monetary parameters, which are linked to a single of the pooled risk exposed components 51,52,53,54. The present invention can involve the use of the mentioned network 60, such as, e.g., computer networks or telecommunications networks, and/or the internet and digitally stored value systems. Electronic funds transfer (EFT), direct deposit, digital gold currency and virtual currency are further examples of electronic money. Also, the transfer can involve technologies, such as financial cryptography and technologies enabling the same. For the transaction of the monetary parameters, it is preferable that hard electronic currency be used, without the technical possibilities for disputing or reversing any charges. The resource-pooling system 20,21 can support, for example, non-reversible transactions. The advantage of this arrangement is that the operating costs of the electronic currency system are greatly reduced by not having to resolve payment disputes. However, this way, it is also possible for electronic currency transactions to clear instantly, making the funds available immediately to the automated insurance systems 20,21. This means that using hard electronic currency is rather akin to a cash transaction. However, also conceivable is the use of soft electronic currency, such as currency that allows for the reversal of payments, for example, having a "clearing time" of 72 hours, or the like. The modality of the electronic monetary parameter exchange applies to all connected systems and modules related to the resource-pooling systems 20,21 of the present invention, such as, e.g., appropriate payment transfer modules.

LIST OF REFERENCE SIGNS

10 Control and monitoring system
11 First database
111 Recognition block-map
1111, 1112, 1113 Triggerable block elements
112 First searchable data structure
12 Second database
121 Second searchable data structure
1211, 1212 Stored workflow objects
13 Process management engine
131 Core engine
132 Recognition module
133 Classification module
134 Entity extraction module
135 Key-word flagging module
136 Trigger module
1361 Threshold value
14 Signaling module
141,142,143 Control and steering signaling
15 Capturing means
151,152,153,154 Measuring devices and/or sensors
18 Interface module
181,182,183 Input device
19 Process flow (state-structured)
1911,1912,1913 Process state
1921,1922,1923 Process task
20, 21 Insurance underwriting systems
31, 32 Runtime execution devices
311, 321 Signaling interface
321, 322 Process task engine
50,51,52 Risk exposed components
60 Network
71,72,73 Underwriting objects of the process flow or an object-source

The invention claimed is:

1. A method comprising:
generating, by circuitry of a system, a plurality of block elements based on predefined boundary conditions provided by an automated underwriting system and by at least partially extracting data from historical and/or simulated data, the block elements being triggerable parts of workflow objects and comprising one or more of interconnectable search terms and/or meta-data, the block elements being assigned to a recognition block-map and stored by a first searchable data structure provided by a first database, the system being a system for pattern-recognition based monitoring and state-transition-controlled processing of data objects based on conformity measurements, recognizing, measuring, and classifying automatically non-conforming workflow objects based on their measured level of non-conformity, and dynamically reacting to changing environmental or internal conditions or measuring parameters, workflow of the automated underwriting system being monitored by capturing underwriting objects within a pathway of an underwriting process flow, wherein in the underwriting process flow for each underwriting process state, one or more underwriting process tasks are executed by the system to process a workflow object from one process state to a subsequent process state, and an activation of additional process states being triggered upon detection of the non-conforming workflow objects by the system, the system comprising a second database providing a second searchable data structure to store a plurality of workflow objects, the workflow objects of the second database being at least partly generated based on definable boundary condition parameters and/or historical workflow objects;
capturing, by the circuitry of the system, a workflow object within a workflow pathway, and scanning the captured workflow object, thereby recognizing and identifying block elements of the recognition blockmap in the captured workflow object;

for recognizing and identifying block elements, content-scanning the captured workflow object by triggering block elements of the workflow objects by the stored block elements of the first searchable data structure;

classifying triggered block elements of the captured workflow object;

extracting associated entities;

flagging detected search terms of the workflow object;

determining, based on the block elements of the captured workflow object, a proximity factor relative to each of the workflow objects of the second database;

measuring a corresponding proximity factor by matching recognized block elements of the captured workflow object with block elements of a workflow object of the second database, and providing a measure for the proximity of the two workflow objects based on the mutually allocatable block elements;

generating a conformity index and assigning the conformity index to the captured workflow object based on the conformity of the recognized block elements with the stored block elements of the first searchable data structure and based on the conformity of the recognized block elements with workflow objects of the second database, only workflow objects within a predefined range of the proximity factor being selected to generate the conformity index, the conformity index providing a measure for the conformity of the captured workflow object with the predefined boundary conditions of the automated underwriting system; and triggering the additional process states and assigning the additional process states to the underwriting process flow by the circuitry of the system, when a measurement of the conformity index exceeds a risk threshold value, the underwriting process flow of the underwriting system being based on state-transition-controlled processing of workflow objects, wherein the method further comprises dynamically adapting the automated underwriting system with regard to an overall risk pooled from risk exposed components by the automated underwriting system by adapting the predefined boundary conditions reflecting the overall risk appetite of the automated underwriting system, and selecting an object following a state-structured process flow, comprising a plurality of process states, and, for each of the process states, executing one or more process tasks, and processing the selected object from one process state to reach a subsequent process state.

2. The method according to claim 1, further comprising:
generating and transmitting control and steering signaling to associated runtime execution devices via runtime interfaces, the workflow object being processed by executing activated process tasks by the runtime execution devices based on the transmitted control and steering signaling.

3. The method according to claim 2, further comprising:
processing the workflow object based on the underwriting process flow that is dynamically adapted with the generated process tasks by executing the activated process tasks by runtime execution devices, which interact in runtime with the system, based on the transmitted control and steering signaling.

4. The method according to claim 3, wherein a first-tier execution of the system comprises the generation of the process states, and a second-tier execution of the system comprises the generation and association of the additional process tasks, when a measurement of the conformity index is taken that exceeds the risk threshold value, the processing of the workflow object and the appropriate signaling by the system being dynamically adapted by alternating operating parameters of the runtime execution devices.

5. The method according to claim 3, further comprising:
generating appropriate signaling to steer the runtime execution devices that process the selected object according to the process flow and/or additional process flow.

6. The method according to claim 1, further comprising:
extracting and/or generating the one or more of the interconnectable search terms and/or meta-data at least in part from historical and/or simulated data.

7. The method according to claim 1, wherein the block elements comprise, in addition to the one or more of the interconnectable search terms and/or meta-data, a variable weighting parameter, each block element and/or its conformity with the stored block elements and with the recognized block elements with workflow objects is weighted by the variable weighting parameter for generating the conformity index.

8. The method according to claim 1, wherein the stored workflow objects of the second database are at least partly generated based on definable boundary condition parameters selecting block elements from the first database and/or extracting workflow objects from historical workflow objects' data.

9. The method according to claim 1, wherein the measuring measures the corresponding proximity factor by matching recognized block elements of the captured workflow object with block elements of a workflow object of the second database, thereby providing the measure for the proximity of the two workflow objects based on the mutually allocatable block elements and/or their degree of conformity.

10. The method according to claim 1, further comprising:
determining, based on the block elements of the captured workflow object, a proximity factor to each of the workflow objects of the second database, wherein
the measuring measures a corresponding proximity factor by matching recognized block elements of the captured workflow object with block elements of a workflow object of the second database, thereby providing the measure for the proximity of the two workflow objects based on a number of mutually allocatable block elements and/or their degree of conformity.

11. The method according to claim 1, wherein the generating of the conformity index generates the conformity index and the assigning assigns the conformity index to the captured workflow object based on the conformity of the recognized block elements with the stored block elements of the first searchable data structure and based on the conformity of the recognized block elements with workflow objects of the second database, the conformity index providing a measure for the variance of the captured workflow object within the predefined boundary conditions of the automated underwriting system.

12. The method according to claim 1, further comprising:
comparing historical data of processed workflow objects associated with known risk parameters to a present workflow object, the historical data being stored in a memory of the system; and filtering relevant historical workflow object data from the stored historical data, the system being connected to a historical engine device by a data link for data signaling transmission between the system and the historical engine device, and the state-structured process flow being dynamically generated by the system, and the captured workflow object being dynamically processed based on the data signaling transmission from the historical engine device and a process management engine of the system.

13. The method according to claim 1, further comprising:
capturing state parameters of a workflow object by the circuitry of the system;
determining a process state based on the captured state parameters and assigning the process state to the selected object; and
based on the determined process state and/or state parameters of the workflow object, generating at least one process task by the circuitry of the system for a specific process state.

14. The method according to claim 13, further comprising:
activating a generated process task as a function of task parameters assigned to a process task.

15. The method according to claim 13, further comprising:
dynamically operating the underwriting process flow by the circuitry of the system; and
processing, by the circuitry of the system, an underwriting workflow object from the determined process state to reach a subsequent process state by executing the assigned process tasks.

16. The method according to claim 14, wherein the underwriting process flow is dynamically generated and adapted, the workflow object being processed by the system that initiates a subsequent process state by triggering defined trigger values of the task parameters and/or state parameters of the preceding process state.

17. The method according to claim 14, further comprising:
capturing the state parameters and/or the task parameters of the workflow object via measuring sensors.

18. The method according to claim 14, further comprising:
monitoring, by dedicated monitoring and/or measuring devices of the system, processing of the captured workflow object based at least on the captured state parameters, the task parameters, and/or operating parameters.

19. The method according to claim 17, further comprising:
dynamically generating, by the circuitry of the system, at least parts of the task parameters of the process tasks of the additional process states based on the measured conformity index of the captured workflow object.

20. The method according to claim 1, further comprising:
for a subsequent state transition within the process flow, splitting a subsequent process task into subtasks, a subtask being generated by the circuitry of the system to provide the additional process states triggered and assigned to the process flow, when a measurement of the conformity index is taken that exceeds the risk threshold value.

21. The method according to claim 1, wherein the system is self-adapting by automatically capturing processed workflow objects after finishing processing by the underwriting process flow, content of the second database being dynamically altered storing the captured and processed workflow object by the second searchable data structure of the second database.

22. The method according to claim 1, further comprising:
capturing the parameters of the workflow objects via a plurality of input devices that are accessible by the risk exposed components and/or automated insurance systems to dynamically adapt the workflow objects via an interface and/or network based on appropriate signal generation by the circuitry of the system.

23. The method according to claim 1, further comprising:
automatically assembling the workflow object within the workflow pathway by the circuitry of the system based on a predefined structure by composing the plurality of block elements triggered within the first database.

24. The method according to claim 1, further comprising:
based on conformity of the recognized block elements with workflow objects of the second database, substituting at least one risk-importing recognized block element of the workflow object by block elements triggered within the first database improving the measured conformity index.

25. The method according to claim 24, further comprising:
substituting risk-importing recognized block elements of the workflow object by block elements triggered within the first database until the measured conformity index of the captured workflow object is measured within the predefined boundary conditions of the monitoring and automated underwriting system.

26. A system comprising:
circuitry configured to
generate a plurality of block elements based on predefined boundary conditions provided by an automated underwriting system and by at least partially extracting data from historical and/or simulated data, the block elements being triggerable parts of workflow objects and comprising one or more of the interconnectable search terms and/or meta-data, the block elements being assigned to a recognition block-map and stored by a first searchable data structure provided by a first database, the system being a system for pattern-recognition based monitoring and state-transition-controlled processing of data objects based on conformity measurements, recognizing, measuring, and classifying automatically non-conforming workflow objects based on their measured level of non-conformity, and dynamically reacting to changing environmental or internal conditions or measuring parameters, workflow of an automated underwriting system being monitored by consecutively capturing underwriting objects within a pathway of an underwriting process flow, wherein in the underwriting process flow for each underwriting process state, one or more underwriting process tasks are executed by the system to process a workflow object from one process state to a subsequent process state, and an activation of process states being triggered upon detecting the non-conforming workflow objects; and
a second database that provides a second searchable data structure to store a plurality of workflow objects, the workflow objects of the second database being at least in part generated based on definable boundary condition parameters and/or generated based on historical workflow objects, wherein
the circuitry is further configured to capture a workflow object within a workflow pathway, and scan the captured workflow object, thereby recognizing and identifying block elements of the stored recognition block-map in the captured workflow object, for recognizing and identifying block elements, content-scan the captured workflow object by triggering block elements of the workflow objects by the stored block elements of the first searchable data structure, classify triggered block elements of the captured workflow object, extract associated entities, flag detected search terms of the workflow object, determine, based on the block elements of the captured workflow object, a proximity factor with regard to each of the workflow objects of the second database, measure a corresponding proximity factor by matching recognized block elements of the captured workflow object with block elements of a workflow object of the second database, and providing a measure for the proximity of the two workflow objects based on the mutually allocatable block elements, generate a conformity index and assign the conformity index to the captured workflow object based on the conformity of the recognized block elements with the stored block elements of the first searchable data structure and based on the conformity of the recognized block elements with workflow objects of the second database, only workflow objects within a predefined range of the proximity factor being selected to generate the conformity index, the conformity index providing a measure for the conformity of the captured workflow object within the predefined boundary conditions of the automated underwriting system, and trigger the process states and assign the process states to the underwriting process flow, when a measurement of the conformity index exceeds a risk threshold value, the underwriting process flow of the underwriting system being based on state-transition-controlled processing of workflow objects, wherein the circuitry is further configured to dynamically adapt the automated underwriting system with regard to an overall risk pooled from risk exposed components by the automated underwriting system by adapting the predefined boundary conditions reflecting the overall risk appetite of the automated underwriting system, and select an object following a state-structured process flow, comprising a plurality of process states, and, for each of the process states, execute one or more process tasks, and process the selected object from one process state to reach a subsequent process state.

* * * * *